S. GLASGOW.
COMBINED BUMPER AND FENDER FOR AUTOMOBILES.
APPLICATION FILED JAN. 30, 1915.
1,140,899.
Patented May 25, 1915.
2 SHEETS—SHEET 1.
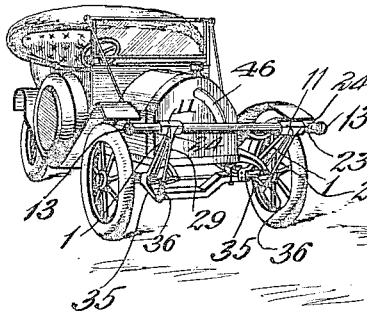
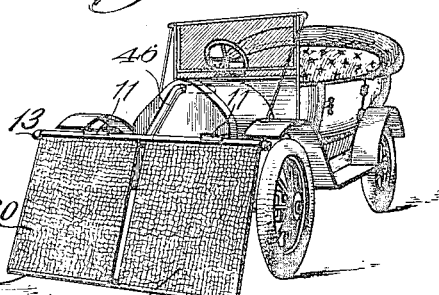
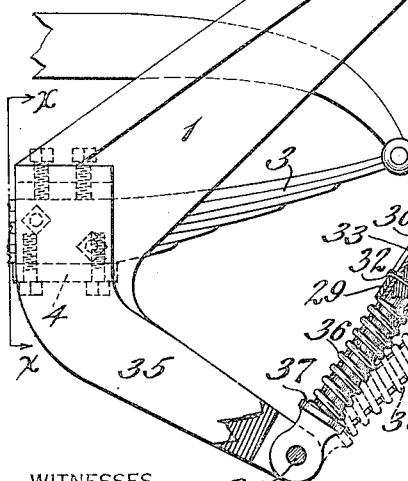
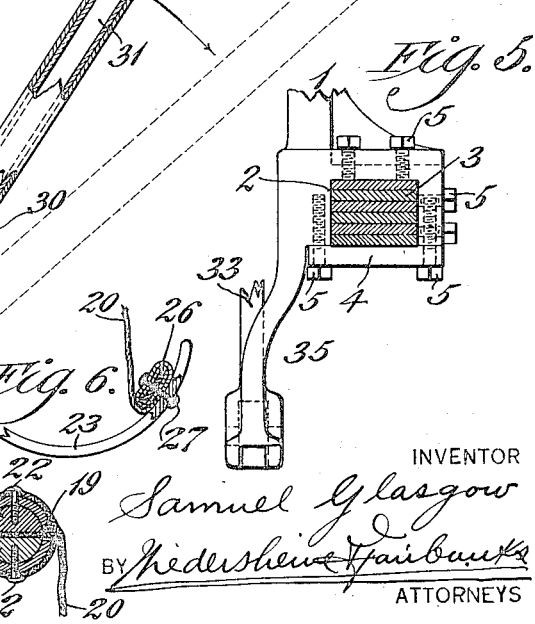
WITNESSES
INVENTOR
Samuel Glasgow
BY Hedersheim Fairbanks
ATTORNEYS S. GLASGOW.
COMBINED BUMPER AND FENDER FOR AUTOMOBILES.
APPLICATION FILED JAN. 30, 1915.
1,140,899.
Patented May 25, 1915.
2 SHEETS—SHEET 2.
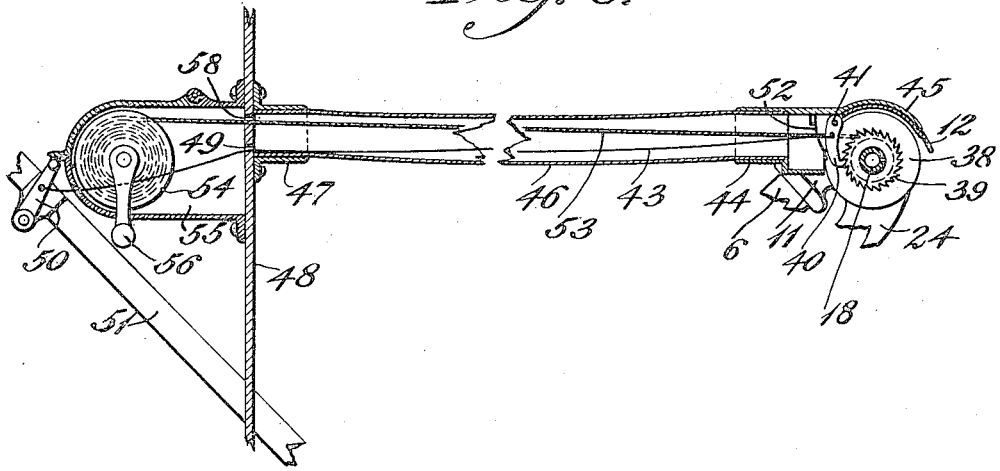
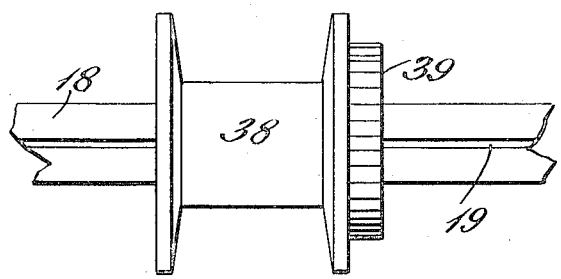
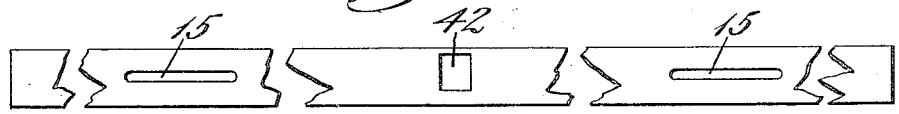

UNITED STATES PATENT OFFICE.

SAMUEL GLASGOW, OF PHILADELPHIA, PENNSYLVANIA.

COMBINED BUMPER AND FENDER FOR AUTOMOBILES.

1,140,899.

Specification of Letters Patent.

Patented May 25, 1915.

Application filed January 30, 1915. Serial No. 5,170.

*To all whom it may concern:*

Be it known that I, SAMUEL GLASGOW, a citizen of the United States, residing in the city and county of Philadelphia, State of Pennsylvania, have invented a new and useful Combined Bumper and Fender for Automobiles, of which the following is a specification.

In the use of motor vehicles, especially in places where the traffic is congested, accidents frequently occur, due to the vehicle running into pedestrians, with the result that the pedestrians are seriously and sometimes fatally injured.

It is the purpose of my present invention to devise a novel fender which will eliminate, in a large measure, the liability of pedestrians being injured by the motor vehicle.

With the above in view, my invention, in its broad and generic scope, consists of a novel construction and arrangement of fender which, when in closed position, has the functions and advantages of a bumper or cushioning device, and which, when in open position, has the functions and advantages of a fender.

It further consists of a novel construction and arrangement of a fender apron or net work and novel means for manually controlling the operation thereof.

It further consists of a novel construction for supporting the movable parts of the fender and for securing the fender in assembled position with respect to a vehicle.

It further consists of novel means for mounting the apron and securing the ends thereof with respect to coöperating parts of the fender mechanism.

It further consists of a novel construction of a fender, in which provision is made to permit the fender to automatically adjust itself in accordance with the position of the vehicle on the road, and wherein novel means are provided for cushioning the movable part of the fender and also for mounting the fender in such a manner that the shock due to contacting with an object is taken off the motor or engine of the vehicle.

It further consists of novel means for effecting the adjustment of the width of the fender.

It further consists of a novel construction and arrangement of fender, which, when in closed position, presents the appearance of an automobile bumper.

Other novel features of construction and advantage will hereinafter more clearly appear in the detailed description of my invention.

For the purpose of illustrating the invention, I have shown in the accompanying drawings, one form thereof which is at present preferred by me, since the same will give in practice satisfactory and reliable results, although it is to be understood that the various instrumentalities of which my invention consists can be variously arranged and organized, and that my invention is not limited to the precise arrangement and organization of these instrumentalities as herein shown and described.

Figure 1 represents a perspective view of an automobile, in conjunction with which a combined bumper and fender embodying my invention is employed, the fender being shown in closed position. Fig. 2 represents a perspective view of an automobile, in conjunction with which a fender embodying my invention is employed, the fender being shown in open position. Fig. 3 represents a sectional elevation of a portion of the fender, in detached position. Fig. 4 represents a side elevation, partly in section, of my device, in assembled position with respect to a vehicle spring. Fig. 5 represents a sectional view of Fig. 4 the section being taken on line $x$—$x$ of said figure. Figs. 6 and 7 represent, respectively, sectional views illustrating more clearly the manner in which the fender apron, or curtain is secured with respect to the parts coöperating therewith. Fig. 8 represents, in sectional elevation, the apron controlling means. Fig. 9 represents a side elevation of a spool and ratchet employed. Fig. 10 represents a rear elevation of a section of the casing. Fig. 11 represents a side elevation of a modified arrangement for effecting the release of the fender.

Similar numerals of reference indicate corresponding parts in the figures.

Referring to the drawings:—1 designates hangers or supporting brackets of a combined bumper and fender embodying my invention, said brackets being provided with a channel or slot 2, whereby they may be connected with the vehicle spring 3, by means of a plate 4 and fastening devices 5, certain of which pass through said plate and are in threaded engagement with the brackets 1. The brackets are each provided with a forwardly and upwardly directed arm 6 having an aperture 7 at its outer end, in which is rotatably mounted a shank 8, which latter is provided with a groove 9 into which the screw or other fastening device 10 extends to prevent relative longitudinal movement of the shank 8 and the arm 6. The shanks 8 are connected with or form a part of the arms or brackets 11, the outer portion of which has a hemispherical contour.

12 designates an upper casing section which is secured at its ends to the end blocks or knobs 13 by means of fastening devices 14. The casing section 12, as seen in Fig. 10, is provided with the longitudinally extending slots 15, through which the fastening devices 16 extend, which latter are carried by the arms 11, as seen in Fig. 4. By such construction, the casing section 12 may be laterally adjusted with respect to the vehicle. The end members or closures 13, (see Fig. 3), have mounted therein anti-friction devices 17 illustrated as consisting of an anti-friction device having roller bearings, whereby a roll 18 is rotatably mounted on said bearings. The roll 18 is provided with the longitudinally extending slot 19 through which the fender apron or net-work 20 is adapted to be inserted (see Fig. 7).

21 designates hemispherical members adapted to be received in the roll 18 and spaced from each other so that the end of the apron 20 may be passed therethrough. The apron is then wrapped a desired number of times around the roll 18 and secured thereto by means of fastening devices 22 of any desired type. It will thus be seen that the upper end of the fender apron, in the present instance, is rotatably carried by the upper casing section 12, while the lower end thereof is secured to the lower casing section 23 in the manner seen in Fig. 6. The casing section 23 is preferably hemispherical, so that when the sections are in the position seen in Fig. 4, a chamber is formed which incloses and entirely conceals the fender apron. The section 23 is preferably slotted in a similar manner to that seen in Fig. 10, so that it may be secured to the lower arms or brackets 24 by means of fastening devices 25 and be laterally adjustable with respect thereto. As seen in Fig. 6, the lower end of the apron 20 is wrapped a desired number of times around a longitudinally extending bar or plate 26 and rivets or other fastening devices 27 pass through the bar, the wrapped portion of the apron, and the lower casing section 23 to secure the apron 20 in fixed relation with respect to the lower casing section 23. The arms or brackets 24 are rigidly connected by means of fastening devices 28 with a tubular connection 29 having longitudinally extending slots 30.

31 designates an inner tubular connection which telescopes within the outer tube 29 and the relative movement of said tubes 29 and 31 is limited by means of a pin 32 passing through the inner tube 31 and extending into the slots 30. In the present instance, the pin 32 passes through a link 33 which extends into the inner tube and which is pivoted at 34 to a downwardly and outwardly extending arm 35 of the hanger 1. This arm 35 is bent in the manner described in order to allow the steering rods of the motor vehicle to pass thereover and to permit the proper movement of the fender mechanism without interfering with the projecting parts of the motor vehicle body or mechanism carried thereby.

36 designates a cushioning or tension device interposed between a shoulder 37 on the link 33 and the tube 29. The roll 18 has mounted thereon a spool 38 and a ratchet 39, with which latter coöperates a pawl 40 pivoted at 41 to a fixed portion of the mechanism. As seen in Fig. 10, the casing section 12 has an aperture 42, through which extends an actuating cable 43, which also passes through a casing 44 having an overhang or flange 45 which is connected in any desired manner to the upper casing section 12.

46 designates a flexible tube, one end of which is received in the casing 44 and the other end thereof is received in a flange sleeve 47 secured in any desired manner to the dash 48 of the automobile, which latter is provided with an aperture 49 through which the cable 43 passes. Said cable is connected with a releasing member 50 mounted on the steering wheel 51 of the motor vehicle, and the pawl 40 is provided with a spring 52, whereby it is normally maintained in engagement with the ratchet 39.

53 designates a cable which is connected with the spool 38 and also with a spool 54 rotatably mounted in a sectional casing 55 secured to the dash 48, and an actuating handle 56 is provided for rotating the spool 54.

It is also within the scope of my invention to provide a pedal arrangement, as seen in Fig. 11, for operating the cable 43, and in this embodiment, 57 designates a foot pedal operatively connected with the cable 43. The cable 53 passes through an aperture 58 in the dash.

The spool 38 and ratchet 39 can be located at any desired point on the roll 18 and for purpose of illustration I have shown the same as being centrally located and the apron or net-work is divided into a plurality of parts, as will be understood by reference to Fig. 2, so that the apron will not be interfered with, when the same is to be extended or retracted.

The operation of my novel combined bumper and fender will now be readily apparent to those skilled in this art, and is as follows:—The supporting brackets or hangers 1 are secured with respect to the vehicle spring in the manner seen in Figs. 1 and 4, so that they are located in front of the front axle of the vehicle. A plurality of fastening devices 5 are employed to provide for securing the brackets to springs of different width and for the purpose of leveling the arms 6 which carry the upper portion of the fender mechanism. When the parts are in the position seen in Fig. 1 and in full lines in Fig. 4, the fender is in closed position and presents the appearance and has the function of an ordinary automobile bumper. If the driver of the motor vehicle sees that he is about to strike a pedestrian or other object, he moves the lever 50 toward him or actuates the pedal 57, whereupon the pawl 40 will be released from its engagement with the ratchet 39, and such ratchet mechanism will permit the fender to open, due to gravity and its own weight until the fender apron and its adjuncts assume the position seen in Fig. 2. When it is desired to close the fender, it is simply necessary for the driver to actuate the handle 56, whereupon the apron 20 will be rolled up on the roll 18 and will be wholly contained within and concealed by the casing sections 12 and 23. The fender apron, when in closed position, will thus be protected from rain or other climatic conditions and from dirt and dust, and the fender mechanism, when closed, will present the appearance of an ordinary buffer or bumper and will not detract from the appearance of the motor vehicle. The adjustable connection formed by the telescoping tubes 29 and 31 is provided with a cushioning or tensioning device, so as to reduce to a minimum the shock to any object with which the fender mechanism comes into contact, and since the entire fender mechanism is carried by the vehicle spring, the shock to the motor or engine of the vehicle is uniformly distributed.

It will now be understood that I provide a sectional casing to which the fender apron is connected and within which it is concealed; and means are provided to effect the relative movement of said sections to cause the apron to be extended or retracted.

Attention is directed to the novel manner of mounting the upper section on the supporting brackets, so that the fender mechanism is free to move in accordance with the vibrations to which it is subjected by the moving vehicle and the position of the moving vehicle on the road. Attention is also directed to the fact that the various parts of the controlling mechanism are concealed from view, so that they are fool proof, are not liable to be injured, and do not detract from the appearance of the motor vehicle.

It will further be apparent that in order to assemble my device with respect to vehicles now in use, it is simply necessary to provide apertures for the cables, such as 43 and 53, to pass through, and to secure the other parts of the mechanism to the vehicle. The cable 53 is fastened to the spools coöperating therewith in such a manner that there will be enough of play to take up the motion of the car. It will also be apparent that by proper actuation of the cables, the parts may be locked so that the apron may be extended or retracted to any desired extent.

It will now be apparent that I have devised a novel and useful combined bumper and fender for automobiles, which embodies the features of advantage enumerated as desirable in the statement of the invention and the above description, and while I have, in the present instance, shown and described a preferred embodiment thereof which will give in practice satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. A device of the character stated, comprising a two part bumper, an apron normally held within the bumper, means for opening the bumper and releasing the apron, and means accessible from the driver's seat to effect the retraction of said apron and the closing of the bumper.

2. A combined bumper and fender, comprising a sectional casing, an apron contained within said casing and connected with the sections, means accessible to the driver to effect the extension of said apron, and means accessible to the driver to effect the retraction of said apron.

3. A device of the character stated, comprising a casing consisting of an upper and a lower section, rotatably mounted brackets connected to said upper section, a fender apron concealed within said casing, and means to effect the extension and retraction of said apron.

4. A device of the character stated, comprising two relatively movable members, brackets rotatably mounted and connected with one of said members, an apron connected to said members and inclosed thereby when they are in closed position, and means to effect the extension and retraction of said apron.

5. A device of the character stated, comprising stationary supporting brackets, brackets rotatably mounted therein, a casing comprising sections one of which is fixed to said rotatably mounted brackets, a fender apron connected with said sections and inclosed thereby when the fender apron is in closed position, means accessible to the vehicle driver to effect the extension of said fender apron, and means accessible to the vehicle driver to effect the retraction of said fender apron.

6. A device of the character stated, comprising supporting brackets, a sectional casing, means rotatably carried by said brackets and connected with one of said sections, longitudinally adjustable connections secured to the other of said sections and to said brackets, tension devices for said connections, an apron having its end connected to one of said sections, a roll rotatably mounted in the other of said sections and to which the other end of said apron is connected, and means accessible to the vehicle driver to effect the winding up and unwinding of said roll.

7. A device of the character stated, comprising supporting brackets, a sectional casing, means rotatably carried by said brackets and connected with said casing, a roll rotatably mounted within one of said sections and concealed within the casing when the sections are closed, an apron connected with the roll of the roll-carrying section and with the other of said sections, and means to actuate said roll to effect the opening or closing of said apron.

8. A device of the character stated, comprising supporting brackets, a casing having relatively movable sections, means rotatably carried by said brackets and connected with one of said sections, said sections when closed forming a chamber, a roll rotatably carried by one of said sections and inclosed within said chamber, a fender apron having one end connected with the roll of the roll carrying section and the other end connected with the other of said sections, ratchet mechanism for said roll, means to control said ratchet mechanism to effect the unwinding of said roll, and means accessible to the vehicle driver to wind up said roll.

9. A device of the character stated, comprising supporting brackets having outwardly extending arms, a casing having relatively movable sections, the upper of which is carried by said arms, telescoping sections movably mounted on said brackets and connected with the lower section, said casing sections when closed forming a chamber, a roll rotatably mounted in said upper section, an apron connected with said roll and with said lower section and concealed within the casing when the casing sections are in closed position, tension devices for said connections, means to effect the rotation of said roll in either direction, means to lock said roll in a desired position, and means to effect the unlocking of said roll.

10. A device of the character stated, comprising a rotatably mounted roll, means including a bumper to mount said roll with respect to the vehicle, a fender apron connected to said roll, said bumper normally inclosing said apron, means accessible to the vehicle driver to rotate said roll to wind up said apron, means to lock said roll in adjusted position, and devices to effect the unlocking of said roll to extend said apron.

11. A device of the character stated, comprising a rotatably mounted roll having an aperture therethrough, a longitudinally extending slot communicating with said aperture, members within said aperture, a fender apron passing through said slot and extending between said members, means to secure said apron to said roll, a sectional casing forming a chamber in which said roll is mounted, and means accessible to the vehicle driver to effect the extension and retraction of said apron.

12. A device of the character stated, comprising a roll rotatably mounted, means to mount said roll with respect to a vehicle, a fender apron carried by said roll, means to effect the release of said apron, a cable operatively connected with said roll to effect the retraction of said apron, a flexible sleeve in which said cable is concealed, and means located in a position accessible to the vehicle operator to actuate said cable.

13. A device of the character stated, comprising a roll rotatably mounted, means to mount said roll with respect to a vehicle, a fender apron carried by said roll, a spool on said roll, a cable operatively connected with said spool, a second spool located accessible to the vehicle operator and around which said cable passes, an actuating arm for said second spool, a ratchet on said roll, a pawl for said ratchet, and means accessible to the vehicle operator for actuating said pawl.

14. A combined bumper and fender, comprising hangers having upwardly and downwardly directed arms, brackets rotatably mounted in said upwardly extending arms and prevented from longitudinal movement therein, a casing section secured to said hangers, a second casing section, an adjustable connection secured thereto and to said downwardly directed arms, a tension device for said connection, a roll rotatably mounted in one of said sections, a fender apron secured to said roll and to one of said sections and concealed within said sections when they are in closed position, and means accessible to the driver to control the extension and retraction of said apron and relative movement of said sections.

15. A combined bumper and fender, comprising a sectional tube, the upper section of which is carried by the vehicle, end closures secured to one of said sections, a roll having its ends rotatably carried by said closures, bumper and fender will now be readily apparent to those skilled in this art, and is as follows:—The supporting brackets or hangers 1 are secured with respect to the vehicle spring in the manner seen in Figs. 1 and 4, so that they are located in front of the front axle of the vehicle. A plurality of fastening devices 5 are employed to provide for securing the brackets to springs of different width and for the purpose of leveling the arms 6 which carry the upper portion of the fender mechanism. When the parts are in the position seen in Fig. 1 and in full lines in Fig. 4, the fender is in closed position and presents the appearance and has the function of an ordinary automobile bumper. If the driver of the motor vehicle sees that he is about to strike a pedestrian or other object, he moves the lever 50 toward him or actuates the pedal 57, whereupon the pawl 40 will be released from its engagement with the ratchet 39, and such ratchet mechanism will permit the fender to open, due to gravity and its own weight until the fender apron and its adjuncts assume the position seen in Fig. 2. When it is desired to close the fender, it is simply necessary for the driver to actuate the handle 56, whereupon the apron 20 will be rolled up on the roll 18 and will be wholly contained within and concealed by the casing sections 12 and 23. The fender apron, when in closed position, will thus be protected from rain or other climatic conditions and from dirt and dust, and the fender mechanism, when closed, will present the appearance of an ordinary buffer or bumper and will not detract from the appearance of the motor vehicle. The adjustable connection formed by the telescoping tubes 29 and 31 is provided with a cushioning or tensioning device, so as to reduce to a minimum the shock to any object with which the fender mechanism comes into contact, and since the entire fender mechanism is carried by the vehicle spring, the shock to the motor or engine of the vehicle is uniformly distributed.

It will now be understood that I provide a sectional casing to which the fender apron is connected and within which it is concealed; and means are provided to effect the relative movement of said sections to cause the apron to be extended or retracted.

Attention is directed to the novel manner of mounting the upper section on the supporting brackets, so that the fender mechanism is free to move in accordance with the vibrations to which it is subjected by the moving vehicle and the position of the moving vehicle on the road. Attention is also directed to the fact that the various parts of the controlling mechanism are concealed from view, so that they are fool proof, are not liable to be injured, and do not detract from the appearance of the motor vehicle.

It will further be apparent that in order to assemble my device with respect to vehicles now in use, it is simply necessary to provide apertures for the cables, such as 43 and 53, to pass through, and to secure the other parts of the mechanism to the vehicle. The cable 53 is fastened to the spools coöperating therewith in such a manner that there will be enough of play to take up the motion of the car. It will also be apparent that by proper actuation of the cables, the parts may be locked so that the apron may be extended or retracted to any desired extent.

It will now be apparent that I have devised a novel and useful combined bumper and fender for automobiles, which embodies the features of advantage enumerated as desirable in the statement of the invention and the above description, and while I have, in the present instance, shown and described a preferred embodiment thereof which will give in practice satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. A device of the character stated, comprising a two part bumper, an apron normally held within the bumper, means for opening the bumper and releasing the apron, and means accessible from the driver's seat to effect the retraction of said apron and the closing of the bumper.

2. A combined bumper and fender, comprising a sectional casing, an apron contained within said casing and connected with the sections, means accessible to the driver to effect the extension of said apron, and means accessible to the driver to effect the retraction of said apron.

3. A device of the character stated, comprising a casing consisting of an upper and a lower section, rotatably mounted brackets connected to said upper section, a fender apron concealed within said casing, and means to effect the extension and retraction of said apron.

4. A device of the character stated, comprising two relatively movable members, brackets rotatably mounted and connected with one of said members, an apron connected to said members and inclosed thereby when they are in closed position, and means to effect the extension and retraction of said apron.

5. A device of the character stated, comprising stationary supporting brackets, brackets rotatably mounted therein, a casing comprising sections one of which is fixed to said rotatably mounted brackets, a fender apron connected with said sections and inclosed thereby when the fender apron is in closed position, means accessible to the vehicle driver to effect the extension of said fender apron, and means accessible to the vehicle driver to effect the retraction of said fender apron.

6. A device of the character stated, comprising supporting brackets, a sectional casing, means rotatably carried by said brackets and connected with one of said sections, longitudinally adjustable connections secured to the other of said sections and to said brackets, tension devices for said connections, an apron having its end connected to one of said sections, a roll rotatably mounted in the other of said sections and to which the other end of said apron is connected, and means accessible to the vehicle driver to effect the winding up and unwinding of said roll.

7. A device of the character stated, comprising supporting brackets, a sectional casing, means rotatably carried by said brackets and connected with said casing, a roll rotatably mounted within one of said sections and concealed within the casing when the sections are closed, an apron connected with the roll of the roll-carrying section and with the other of said sections, and means to actuate said roll to effect the opening or closing of said apron.

8. A device of the character stated, comprising supporting brackets, a casing having relatively movable sections, means rotatably carried by said brackets and connected with one of said sections, said sections when closed forming a chamber, a roll rotatably carried by one of said sections and inclosed within said chamber, a fender apron having one end connected with the roll of the roll carrying section and the other end connected with the other of said sections, ratchet mechanism for said roll, means to control said ratchet mechanism to effect the unwinding of said roll, and means accessible to the vehicle driver to wind up said roll.

9. A device of the character stated, comprising supporting brackets having outwardly extending arms, a casing having relatively movable sections, the upper of which is carried by said arms, telescoping sections movably mounted on said brackets and connected with the lower section, said casing sections when closed forming a chamber, a roll rotatably mounted in said upper section, an apron connected with said roll and with said lower section and concealed within the casing when the casing sections are in closed position, tension devices for said connections, means to effect the rotation of said roll in either direction, means to lock said roll in a desired position, and means to effect the unlocking of said roll.

10. A device of the character stated, comprising a rotatably mounted roll, means including a bumper to mount said roll with respect to the vehicle, a fender apron connected to said roll, said bumper normally inclosing said apron, means accessible to the vehicle driver to rotate said roll to wind up said apron, means to lock said roll in adjusted position, and devices to effect the unlocking of said roll to extend said apron.

11. A device of the character stated, comprising a rotatably mounted roll having an aperture therethrough, a longitudinally extending slot communicating with said aperture, members within said aperture, a fender apron passing through said slot and extending between said members, means to secure said apron to said roll, a sectional casing forming a chamber in which said roll is mounted, and means accessible to the vehicle driver to effect the extension and retraction of said apron.

12. A device of the character stated, comprising a roll rotatably mounted, means to mount said roll with respect to a vehicle, a fender apron carried by said roll, means to effect the release of said apron, a cable operatively connected with said roll to effect the retraction of said apron, a flexible sleeve in which said cable is concealed, and means located in a position accessible to the vehicle operator to actuate said cable.

13. A device of the character stated, comprising a roll rotatably mounted, means to mount said roll with respect to a vehicle, a fender apron carried by said roll, a spool on said roll, a cable operatively connected with said spool, a second spool located accessible to the vehicle operator and around which said cable passes, an actuating arm for said second spool, a ratchet on said roll, a pawl for said ratchet, and means accessible to the vehicle operator for actuating said pawl.

14. A combined bumper and fender, comprising hangers having upwardly and downwardly directed arms, brackets rotatably mounted in said upwardly extending arms and prevented from longitudinal movement therein, a casing section secured to said hangers, a second casing section, an adjustable connection secured thereto and to said downwardly directed arms, a tension device for said connection, a roll rotatably mounted in one of said sections, a fender apron secured to said roll and to one of said sections and concealed within said sections when they are in closed position, and means accessible to the driver to control the extension and retraction of said apron and relative movement of said sections.

15. A combined bumper and fender, comprising a sectional tube, the upper section of which is carried by the vehicle, end closures secured to one of said sections, a roll having its ends rotatably carried by said closures, an apron connected with said roll and with one of said sections and concealed within said sections when the latter are closed, and means accessible to the driver of the vehicle to control the winding up and unwinding of said apron on said roll.

16. A combined bumper and fender, comprising hangers each having a recess therein to receive the vehicle spring and provided with an upwardly extending arm, means to secure said hangers to the vehicle springs, brackets rotatably mounted in said arms, a rotatably mounted roll carried by said brackets, an apron connected to said roll, supporting means connected with said apron and with said hangers, and means accessible to the vehicle driver to effect the unwinding and winding up of said roll and thereby the extension and retraction of said apron.

SAMUEL GLASGOW.

Witnesses:
H. S. FAIRBANKS,
C. D. McVAY.

Copies of this patent may be obtained for five cents each, by addressing the "Commissioner of Patents, Washington, D. C."